March 26, 1929.  A. C. LOEWER  1,706,701

ELECTRICAL INSTRUMENT

Filed Dec. 20, 1926

WITNESSES:

INVENTOR
Alvin C. Loewer.
BY
ATTORNEY

Patented Mar. 26, 1929.

1,706,701

UNITED STATES PATENT OFFICE.

ALVIN C. LOEWER, OF PARKVILLE, MARYLAND, ASSIGNOR TO WESTINGHOUSE ELECTRIC & MANUFACTURING COMPANY, A CORPORATION OF PENNSYLVANIA.

ELECTRICAL INSTRUMENT.

Application filed December 20, 1926. Serial No. 155,814.

My invention relates to electrical measuring instruments and particularly to contact devices for integrating meters.

An object of my invention is to provide a contact device that shall be adapted to cooperate with the register of a watthour meter.

Another object of my invention is to provide means for positively and rapidly closing and opening the contact device of current-impulse apparatus.

The increasing use of substations, especially of the automatic type, has created a demand for remote indications of integrating meter, such as watthour meter, readings. This result is usually accomplished by transmitting current impulses corresponding in rate to the speed of operation of the watthour meter. A simple application of the standard watthour meter so that it may be employed to transmit impulses for remote metering is therefore desirable.

In practicing my invention I provide a contact device that is directly connected through a gear wheel to the first gear of the register of the watthour meter. By employing the mounting screws used in securing the back plate of the register train to the front plate for attaching the contact device to the register, the proper engagement of the driving gear of the contact device with a register gear without any intermediate adjustment is insured, so that all the contact devices are interchangeable and it is unnecessary to drill or tap the register frame to mount the contact device thereon.

Figure 1:
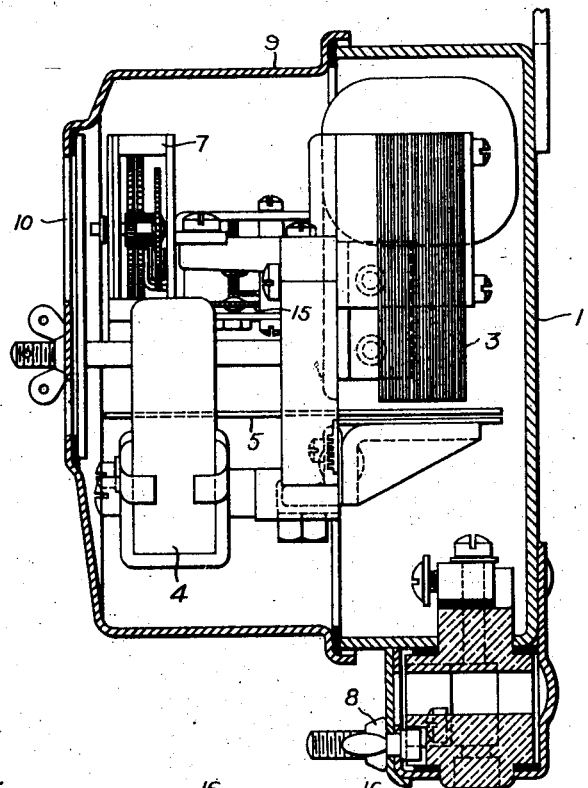
Figure 2:
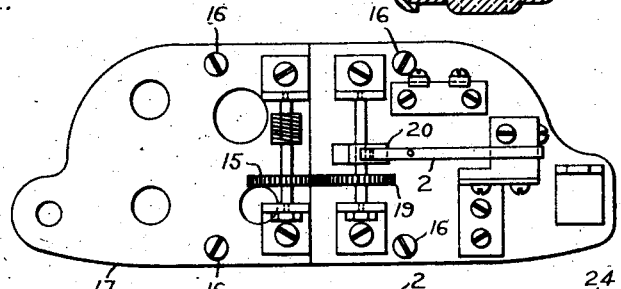
Figure 3:
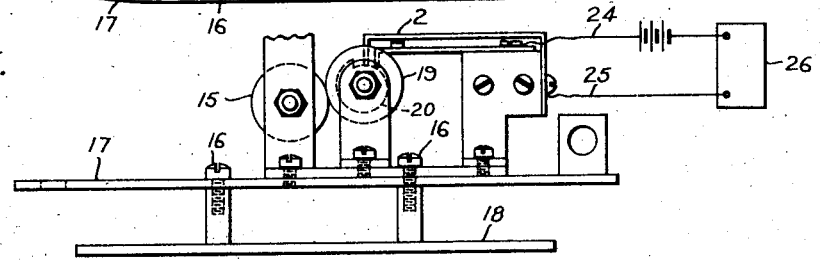
Figure 4:
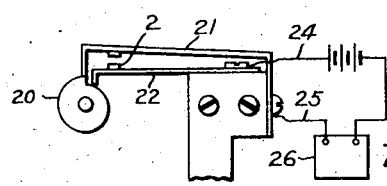

In the accompanying drawings, Fig. 1 is a side view, partially in elevation and partially in section, of an electrical measuring instrument embodying my invention, Fig. 2 is a plan view of the register and the plate carrying the first gear of the register, showing the manner in which a contact device embodying my invention may be directly controlled by the gear train, Fig. 3 is a side view of the register shown in Fig 2, and Fig. 4 shows the cam arrangement by which a positive and rapid closing and opening of the contact device is obtained.

My invention comprises, in general, a current-impulse device such as a watthour meter 1 provided with a contact mechanism 2. The meter 1 is of the usual construction and comprises an electro-magnet 3, a permanent damping magnet 4, both of said magnets cooperating with a rotatable armature member 5, and a register 7. The register 7 is associated with the contact mechanism 2 and the register and contact mechanism are both operated by the armature member 5 in accordance with the degree of energization of the electromagnet 3.

The windings of the electro-magnet are connected to suitable terminals 8. The entire instrument is enclosed in a casing including a removable cover member 9 having a window 10 through which the registration of the meter may be observed.

The details of the meter form no part of the present invention, and are described in the patent to Boddie et al., No. 1,285,911, dated Nov. 26, 1918. The detailed construction is not, therefore, described herein.

The contact device 2, to which my invention particularly relates, is operated by a gear 15 of the register. The device is secured in operative relation to the gear 15 by the screws 16 which are provided for the purpose of holding the back plate 17 and the dial plate 18 of the register in assembled relation, as clearly shown in Fig. 3.

The contact device comprises a gear 19, a cam member 20 on the same shaft as the gear 19 or arranged otherwise so as to be actuated thereby and contact springs 21 and 22 cooperating with the cam member 20. The gear 19 is so mounted, as shown in Figs. 2 and 3, that when the contact device is clamped to the register by means of the screws 16, the gear meshes properly with the register gear 15. The contact device may therefore be added readily to the standard watthour meter without any alteration of the register thereof when it is desired to modify the instrument to control an electrical circuit.

As illustrated in Fig. 4, a slightly counterclockwise movement of the cam member 20 will cause the contact member 21 to drop to its lower position and contact with member 22 with a positive snap movement. During the remainder of the rotation of cam member 20, the contact members 21 and 22 remain closed until just before the position illustrated in the drawing, when because of the shape of cam member 20, the contact member 22 drops to its lower position and opens the contact with a positive snap movement. The contact is thus positively closed and opened once per revolution.

The opening and the closing of the contact members 21 and 22 transmit impulses over lines 24 and 25 to operate a remote register or other current-responsive device 26 shown diagrammatically in Fig. 4.

Although I have shown my invention in its preferred form it will be understood that modifications may be made therein without departing from the spirit and scope of the invention as set forth in the appended claims.

I claim as my invention:

1. The combination with a watthour meter having a dial plate and a back plate, means for rigidly connecting said plates in spaced relation to form a frame, a gear train mounted on the frame, of an auxiliary plate adapted to be secured to the back plate by said connecting means, said auxiliary plate having mounted thereon a gear adapted to be driven by said gear train, a cam driven by said gear and a pair of contact members controlled by said cam.

2. In a watthour meter having a dial plate and a back plate, means for securing said plates together in spaced relation to form a frame, and a gear train supported on said frame, the combination with an auxiliary plate adapted to be secured to said back plate by said securing means, of a gear mounted on said auxiliary plate and adapted to be driven by said gear train, and contact-making means driven by said gear.

In testimony whereof, I have hereunto subscribed my name this 6th day of Dec., 1926.

ALVIN C. LOEWER.